(12) United States Patent
Petrilla et al.

(10) Patent No.: US 10,328,514 B2
(45) Date of Patent: Jun. 25, 2019

(54) USE OF MOBILE COMMUNICATIONS DEVICES AS USER INTERFACE FOR WELDING EQUIPMENT AND SYSTEMS

(75) Inventors: Lucian Petrilla, Cuyahoga, OH (US); Bruce John Chantry, Solon, OH (US); William Thomas Matthews, Chesterland, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 1601 days.

(21) Appl. No.: 13/290,398

(22) Filed: Nov. 7, 2011

(65) Prior Publication Data

US 2013/0112673 A1    May 9, 2013

(51) Int. Cl.
| | |
|---|---|
| B23K 9/00 | (2006.01) |
| B23K 9/10 | (2006.01) |
| B23K 9/013 | (2006.01) |
| B23K 9/02 | (2006.01) |
| B23K 9/095 | (2006.01) |

(52) U.S. Cl.
CPC ............ *B23K 9/1087* (2013.01); *B23K 9/013* (2013.01); *B23K 9/02* (2013.01); *B23K 9/095* (2013.01); *B23K 9/1006* (2013.01)

(58) Field of Classification Search
USPC ............................ 219/132, 130.1; 340/12.25
See application file for complete search history.

(56) References Cited

U.S. PATENT DOCUMENTS

| | | |
|---|---|---|
| 4,641,292 A | 2/1987 | Tunnell et al. |
| 6,479,792 B1 | 11/2002 | Beiermann et al. |
| 6,486,439 B1 | 11/2002 | Spear et al. |
| 6,560,513 B2 | 5/2003 | Krause et al. |
| 6,624,388 B1 | 9/2003 | Blankenship et al. |
| 6,639,182 B2 | 10/2003 | Hayes |
| 6,797,921 B1 | 9/2004 | Niedereder et al. |
| 7,038,167 B2 | 5/2006 | Hayes |
| 7,180,029 B2 | 2/2007 | Ott |
| 7,208,697 B2 * | 4/2007 | Blankenship et al. ... 219/130.21 |
| 7,245,875 B2 | 7/2007 | Clark et al. |
| 7,247,814 B2 * | 7/2007 | Ott ............................... 219/132 |
| 7,294,808 B2 * | 11/2007 | Furman .................. B23K 9/095 |
| | | 219/132 |

(Continued)

FOREIGN PATENT DOCUMENTS

| | | |
|---|---|---|
| CN | 2353480 | 12/1999 |
| CN | 1592666 A | 3/2005 |

(Continued)

OTHER PUBLICATIONS

International Application No. PCT/IB2012/002199, International Search Report & Written Opinion, 8 pages, dated Mar. 14, 2013.

(Continued)

*Primary Examiner* — Anne M Antonucci
*Assistant Examiner* — Renee LaRose
(74) *Attorney, Agent, or Firm* — Perkins Coie LLP

(57) ABSTRACT

A welding or cutting system having a power supply with no user interface hardware or software for controlling the operation of the power supply, and a mobile communication device which contains an application allowing for control of the power supply. The mobile device is coupled to the power supply through either a wired or wireless connection.

9 Claims, 6 Drawing Sheets

(56) References Cited

U.S. PATENT DOCUMENTS

| | | | |
|---|---|---|---|
| 7,307,241 B2 * | 12/2007 | Hayes | 219/130.5 |
| 7,381,922 B2 | 6/2008 | Ulrich | |
| 7,574,172 B2 | 8/2009 | Clark et al. | |
| 7,643,890 B1 | 1/2010 | Hillen et al. | |
| 7,870,223 B2 | 1/2011 | Grgic et al. | |
| 7,902,484 B2 | 3/2011 | Ulrich | |
| 8,785,816 B2 | 7/2014 | Kooken et al. | |
| 8,785,817 B2 * | 7/2014 | Luck et al. | 219/132 |
| 2001/0052858 A1 * | 12/2001 | Vincent et al. | 340/825.69 |
| 2002/0168937 A1 * | 11/2002 | Clark et al. | 455/41 |
| 2003/0071024 A1 * | 4/2003 | Hsu | 219/130.01 |
| 2004/0025047 A1 * | 2/2004 | Mayne et al. | 713/200 |
| 2004/0026392 A1 * | 2/2004 | Feichtinger et al. | 219/130.5 |
| 2005/0016975 A1 * | 1/2005 | Reynolds et al. | 219/132 |
| 2006/0169682 A1 * | 8/2006 | Kainec et al. | 219/125.1 |
| 2007/0262065 A1 * | 11/2007 | Peters et al. | 219/130.5 |
| 2009/0173726 A1 | 7/2009 | Davidson et al. | |
| 2009/0184098 A1 * | 7/2009 | Daniel et al. | 219/130.1 |
| 2009/0222659 A1 | 9/2009 | Miyabayashi et al. | |
| 2009/0222804 A1 | 9/2009 | Kaufman et al. | |
| 2011/0049116 A1 * | 3/2011 | Rappl et al. | 219/132 |

FOREIGN PATENT DOCUMENTS

| | | |
|---|---|---|
| CN | 101421070 A | 4/2009 |
| CN | 101437643 A | 5/2009 |
| CN | 101516561 A | 8/2009 |

OTHER PUBLICATIONS

Chongxi, et al.; "Motion Control System;" New Textbook Series for Automation Category Majors in General Colleges and Universities; http://www.yuyanwz.cn/n/printjsp; Dated Sep. 13, 2014; pp. 1-6.

Examination Report from Corresponding European Application No. 16 000 875.1; dated Feb. 20, 2018.

European Search Report for European Patent Application No. 16000875.1-1702/3125418 dated Jan. 31, 2017.

* cited by examiner

USE OF MOBILE COMMUNICATIONS DEVICES AS USER INTERFACE FOR WELDING EQUIPMENT AND SYSTEMS

FIELD OF THE INVENTION

The present invention relates to the use of various communication devices as a user interface for welding equipment and systems.

BACKGROUND OF INVENTION

As welding technology has advanced, welding power supplies and associated components have become extremely complex in their operation and control circuitry. Although this complexity has enhanced the versatility of welding equipment, it has also significantly increased the costs of welding equipment. Furthermore, not only have the costs of the equipment been increased, but advanced welding equipment has also become more complicated to interface and program.

SUMMARY OF THE INVENTION

A welding or cutting system having a power supply which requires the input of at least one operational parameter to perform a desired operation, and a mobile communication device having a user input application installed thereon which allows a user to input the operational parameter into the mobile communication device. The mobile communication device communicates the operational parameter to the power supply, and the power supply does not have a user input interface such that the operational parameter cannot be input into the power supply without the mobile communication device.

BRIEF DESCRIPTION OF DRAWINGS

The above and/or other aspects of the invention will be more apparent by describing in detail exemplary embodiments of the invention with reference to the accompanying drawings, in which.

DETAILED DESCRIPTION OF EXEMPLARY EMBODIMENTS

Figure 1:
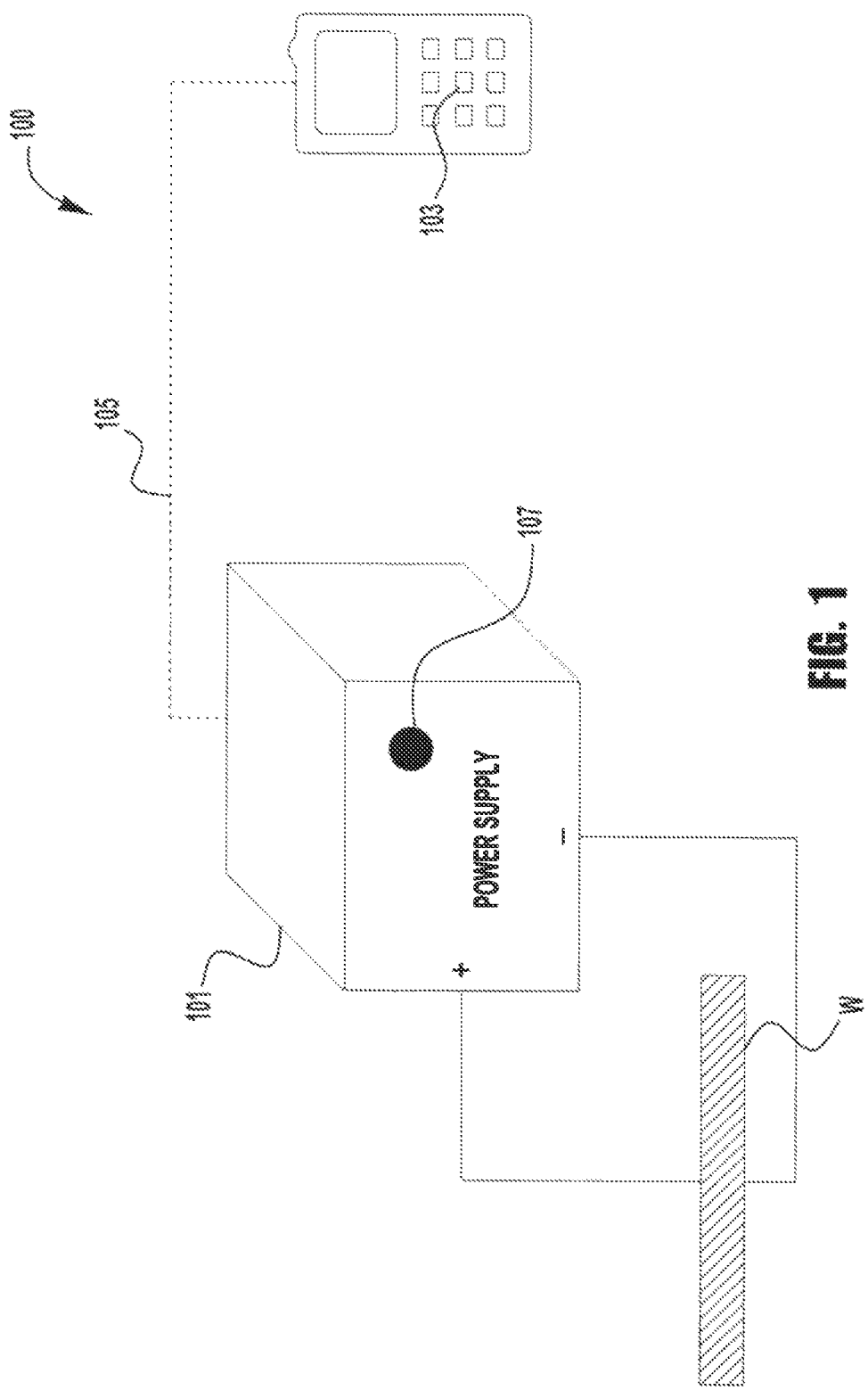
FIG. 1 is a diagrammatical representation of an exemplary embodiment of a welding system of the present invention.

Referring now to the drawings wherein the showings are for the purpose of illustrating exemplary embodiments of the invention only and not for the purpose of limiting the same, a system used in practicing the invention is shown in detail in the drawings and described herein.

As stated previously, the advancements in technology of current welding equipment has greatly increased its versatility and application usage. With this increase in versatility, it has been necessary to develop both hardware and software for the user interface of the welding equipment that permits a user to be able to use the full capabilities of the welding equipment. However, the development and implementation of this user interface hardware and software is resource intensive and time consuming. It also requires the welding equipment to contain sophisticated electronics and control circuitry because the user interface systems and components are located on the welding equipment itself. For example, a welding power supply typically has a user interface panel which allows the user to input various welding parameters as well as monitor some aspects of the welding operation. Welding equipment can have input controls for welding parameters such as: wire feed speed, voltage, current, etc., and can similarly have data display screens, etc. Furthermore, welding power supplies often contain hardware and software to allow the power supply to communicate with other welding equipment, such as wire feeders. For example, a welding power supply may have software and hardware that permits the power supply to communicate a wire feed speed setting to a wire feeder. Additionally all user input controls on a power supply, such as a welding or cutting power supply, must be sufficiently shielded to separate a user from the potentially dangerous electrical currents within the power supply—this isolation adds additional cost and complexity to the power supply.

Furthermore, because of the complexity of welding equipment, it is difficult to train the end users of the equipment or to customize or program the equipment for a particular custom welding operation. Therefore, it is desirable to reduce the cost and complexity of operating modern welding equipment.

FIGS. 1 through 4 depict various embodiments of a welding system in accordance with exemplary embodiments of the present invention. Each figure will be discussed in turn.

FIG. 1 shows a welding system 100 having a mobile communication device 103 and a power supply 101, which is used to weld or cut a workpiece W. The power supply can be any type of welding or cutting power supply, and can be constructed for any known type of welding or cutting operation. For example, the power supply can be a plasma cutting or welding power supply, including but not limited to a GMAW, MIG, TIG, GTAW, SAW, FCAW, etc. type power supply. As an example, the power supply can be a Power Wave® power supply manufactured by The Lincoln Electric Co. of Cleveland, Ohio, or any similar type of welding or cutting power supply. The mobile communication device 103 can be any known or commercially available mobile communication device having sufficient communication and computational capabilities to act as a user interface for the power supply 101. For example, the communication device 103 can be a smartphone, computer tablet or laptop, or similar type of a communication device. In some exemplary embodiments of the present invention, the mobile communication device is a third party communication device. A third party communication device is a commercially available, "off-the-shelf," communication device which is manufactured and sold by a party separate and discrete from the manufacturer of the power supply 103. For example, the mobile device can be a communication device from Apple, Inc., Motorola, Samsung, Nokia, Dell, IBM, RIM, or similar manufacturer. In other exemplary embodiments of the present invention, the communication device is a custom designed and manufactured device specific to th power supply and/or the manufacturer of the power supply. For example, the mobile communication device can be a communication pendant. The communication device is capable of communicating with other devices—such as the power supply—wirelessly (for example, using cellular, Bluetooth, or any other type of wireless connection, such as IEEE 802.11 compliant wireless communications) or via a wired connection (such as a USB type connection) 105. Further, the mobile communication device 103 and the power supply 101 (and other components controlled by the device 103) can operate in/communicate via any type of network. For example, the components of the system 100 can communicate via a cellular, public wireless, private wireless communication network. Further, the components of the system can communicate via an internet based communication network. Examples of such communication methods and systems are described in U.S. Pat. No. 7,245,875 entitled "System and Method to Facilitate Wireless Communication in a Welding Environment" and U.S. Pat. No. 7,574,172 entitled "System and Method to Facilitate Wireless Wide Area Communication in a Welding Environment," both of which are incorporated herein by reference, in their entirety.

Because of the user interface capabilities of the communication device 103, the power supply 101 does not have a user interface or any type of user input controls. That is, the power supply 101, or whatever welding or cutting equipment being controlled, does not have any user interface control or data entry hardware or software. Stated differently, absent the use of the mobile device 103, a user will be unable to input data or otherwise use the power supply 101 for its intended purpose. Rather, the mobile device 103 contains a data and user input application which allows the user to input whatever operational data and parameters are needed to control the power supply 101 to control the operation of the power supply 101. Further, in some exemplary embodiments of the present invention the mobile device 103 also has an application which permits the mobile device to display information regarding the operation of the power supply 101, including real time feedback, weld completion status, power status, etc. Specifically, the system 100 is capable of displaying real time feedback regarding the status of the welding or cutting operation, including but not limited to current, voltage, power, wire feed speed, gas flow rate, weld deposition rate, welding time, or any other parameters desired to be monitored.

Because the creation and implementation of applications on various mobile devices, such as smartphones and tablets, are known they will not be discussed or described in detail herein. The ability to create, install and implement such applications on mobile devices is well within the level of skill of those in the mobile communication, programming and/or welding programming industries.

In another exemplary embodiment of the present invention, the power supply does have a single user control, which is an on/off control switch 107. In such an embodiment the switch 107 is only used to turn on the main power to the power supply 101. However, in other exemplary embodiments, the power supply 101 has no such switch 107 as this function is controlled by the mobile device 103.

By removing the user input capabilities of the power supply 101 the operation complexity and cost of the power supply is significantly reduced. Furthermore, aspects of the present invention allow the power supply 101 to be controlled from remote locations, should that be desired or needed. Thus, it is not necessary that the user be positioned at or near the power supply to start or operate the welding or cutting operation.

Figure 2:
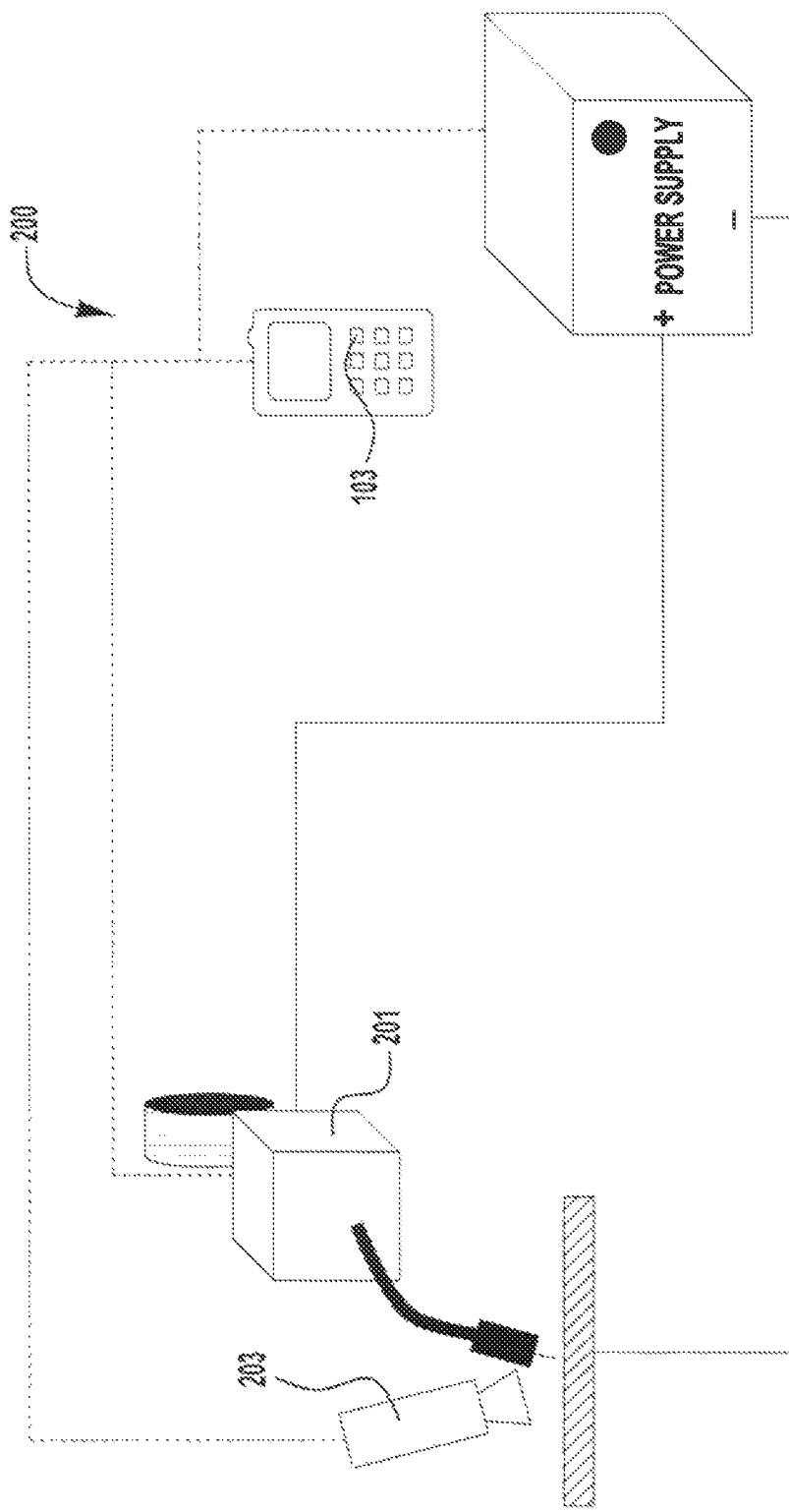
FIG. 2 is a diagrammatical representation of a further exemplary embodiment of a welding system of the present invention.

FIG. 2 depicts another exemplary embodiment of a welding system 200 in accordance with the present invention. However, in this welding system the mobile device also controls the operation of a wire feeder 201 (wirelessly or via a wired connection) and the wire feeder also does not have any user input capabilities, as described above regarding the power supply 101. In a traditional welding system the power supply 101 contains sufficient user input controls to allow a user to also control the operation of the wire feeder 201, for example the wire feed speed or wire direction. That is, the welding power supply 101 and the wire feeder 201 are coupled to each other such that any settings (such as wire feed speed) which is input via the user input controls on the power supply would be transmitted to the wire feeder and, vice versa, any inputs made on the wire feeder user input controls would be transmitted to the power source. However, in embodiments of the present invention, not only does the power supply not have any user input capability, but it has no means to directly communicate with the wire feeder 201. Rather, the mobile device controls the operation of the wire feeder 201 in a similar fashion to that of the power supply 101. The user inputs any relevant user input data into the mobile device 103 which is then communicated directly to the wire feeder 201 to control the operation of the wire feeder 201 (e.g., wire feed speed), and also communicated to the power supply 101 to control the power supply (such as current, voltage, power, etc.). The wire feeder 201 has no separate, dedicated user input ability on the wire feeder itself.

FIG. 2 also depicts a welding imaging system 203 which can be used with exemplary embodiments of the present invention. Because the operation of the power supply can now be controlled remotely it may be desirable to visually monitor the welding operation on the device 103. Thus an imaging system 203, which can be any kind of imaging system (e.g., thermal, visual, etc.) can be located adjacent the welding or cutting operation which then transmits data to the device 103 for display.

Of course, embodiments of the present invention are not limited to using the mobile communication device to control only the power supply and wire feeder, as other components can be similarly controlled. For example, it is contemplated that systems which provide fume extraction or shielding gas can be similarly controlled, thus obviating the need for any of these components having any user input control as described above.

Figure 3:
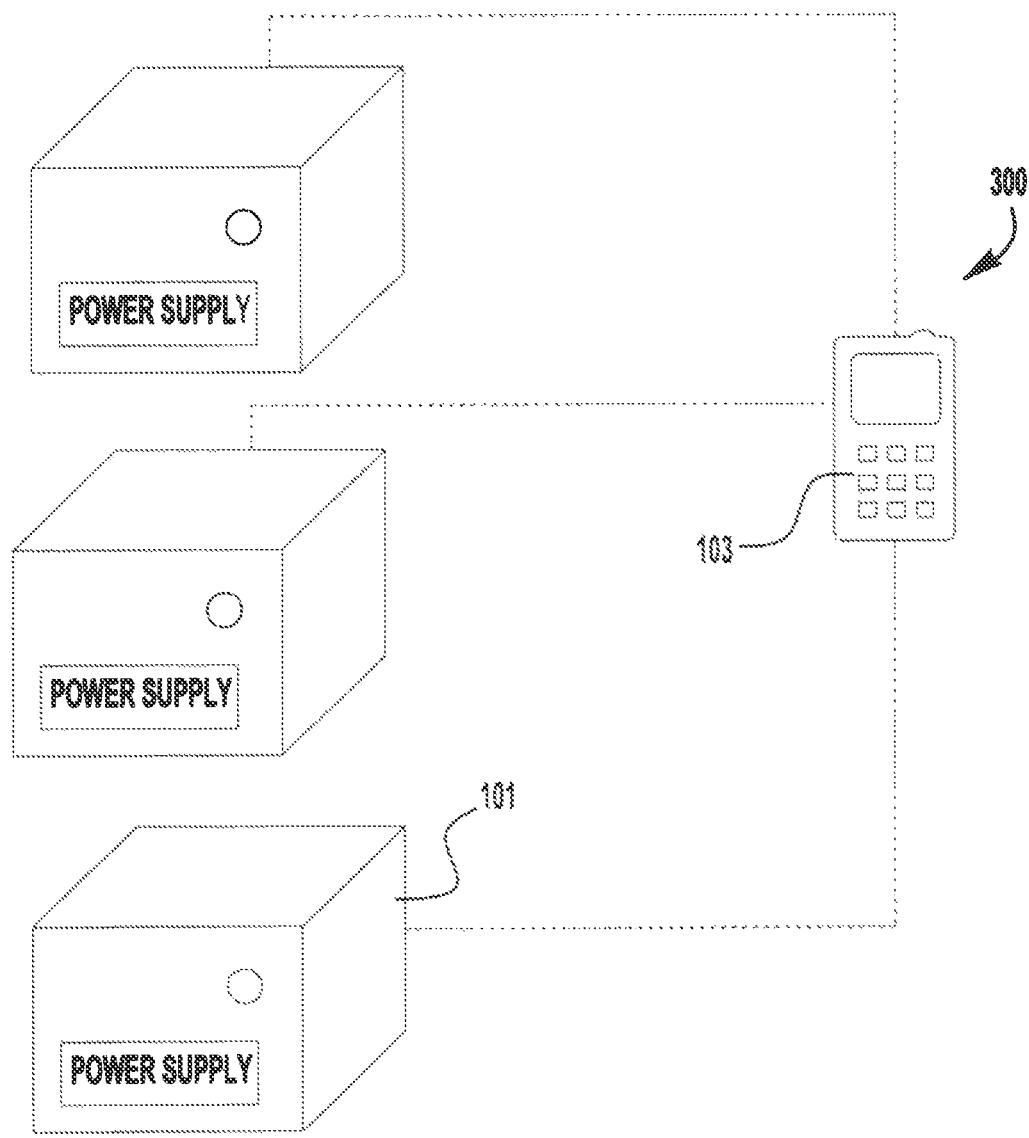
FIG. 3 is a diagrammatical representation of an additional exemplary embodiment of a welding system of the present invention.

FIG. 3 depicts another system 300 in which the mobile device 103 controls the operation of a plurality of power supplies 101. Thus, the user input data application in the mobile device 103 is capable of distinguishing between multiple power sources 101 and has the ability to transmit the appropriate operational data to each power supply in a group of power supplies. Thus, the application on the mobile device 103 has the capability to store power supply identification information and then use that information to control the operation of the proper power supply 101.

Figure 4:
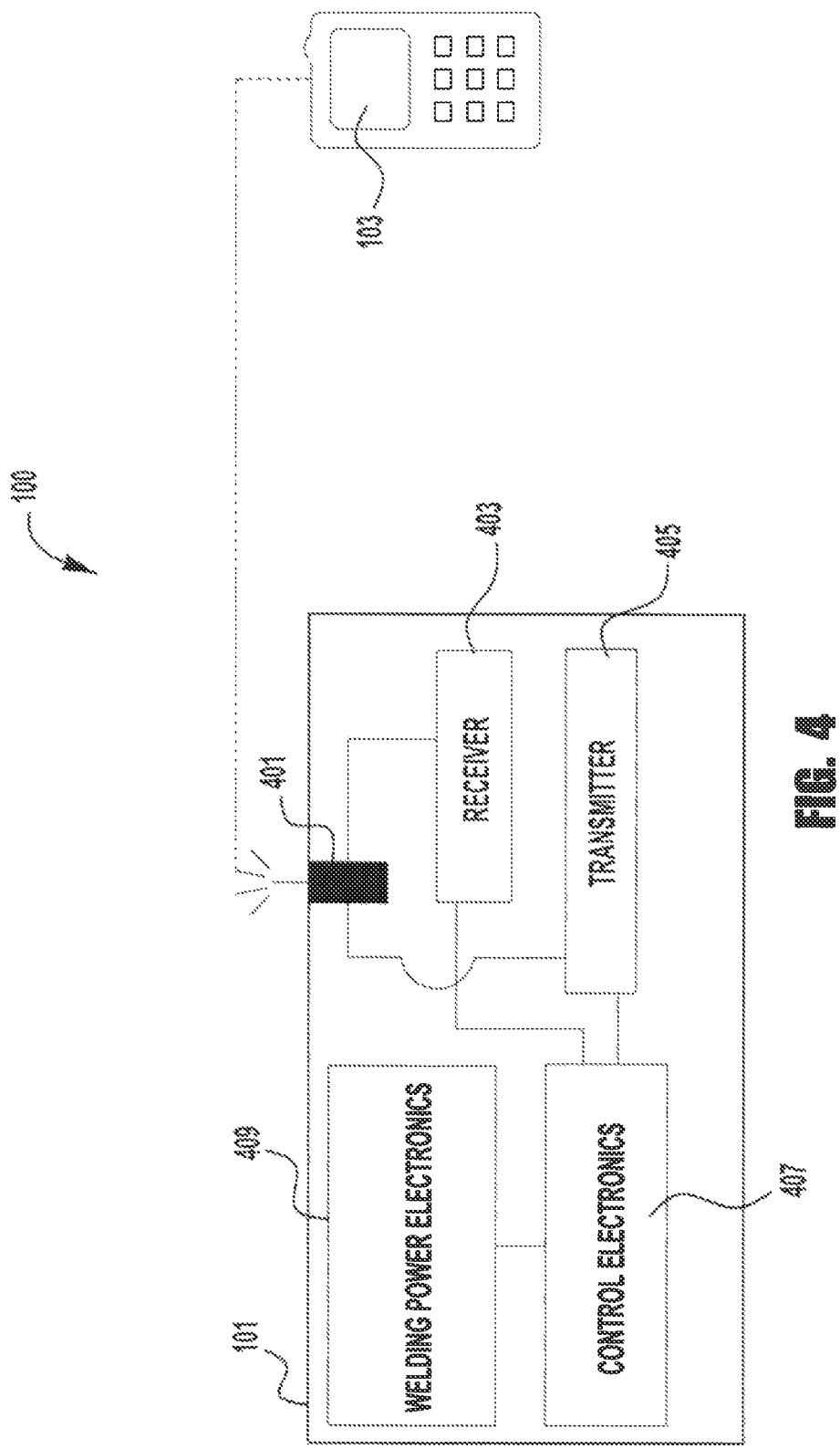
FIG. 4 is a diagrammatical representation of an exemplary embodiment of a welding power supply and system of the present invention.

As shown in FIG. 4, each device/power supply controlled by the device 103 has a receiver 403 and transmitter 405 so that it can communicate with the device 103. To the extent the power supply 101 has wireless communication ability the power supply has an antenna 401 which can facilitate the wireless communication. The antenna 401, receiver 403 and transmitter 405 can be any known type or design capable of receiving and transmitting data from the power supply 101 to the device 103 to facilitate control of the power supply 101. These components are known in various technology areas and need not be described in detail herein. Because the power supply 101 can generate very high power levels and output it will be necessary to ensure that the antenna 401, receiver 403 and transmitter 405 are appropriately shielded so that their operation is not compromised.

Each of the receiver 403 and transmitter 405 are coupled to the control electronics 407 of the power supply, which is in turn coupled to the power electronics 409. During operation the user input information is sent from the device 103 to the control electronics 407 such that the control electronics 407 can properly control the power electronics 409 so that the output of the power supply 101 is as desired. Similarly, any feedback information to be sent to the device 103 is sent by the transmitter 405.

The construction and operation of the control electronics and power electronics 409 are known to those of ordinary skill in the welding art, and need not be described in detail herein. A representative example of the construction of a welding power supply contemplated by embodiments of the present invention, including a discussion of the power and control electronics can be found in U.S. patent application Ser. No. 11/551,957 entitled "Three Stage Power Source for Electric Arc Welding," filed on Oct. 23, 2006, the disclosure of which is incorporated herein by reference in its entirety.

Figure 5:
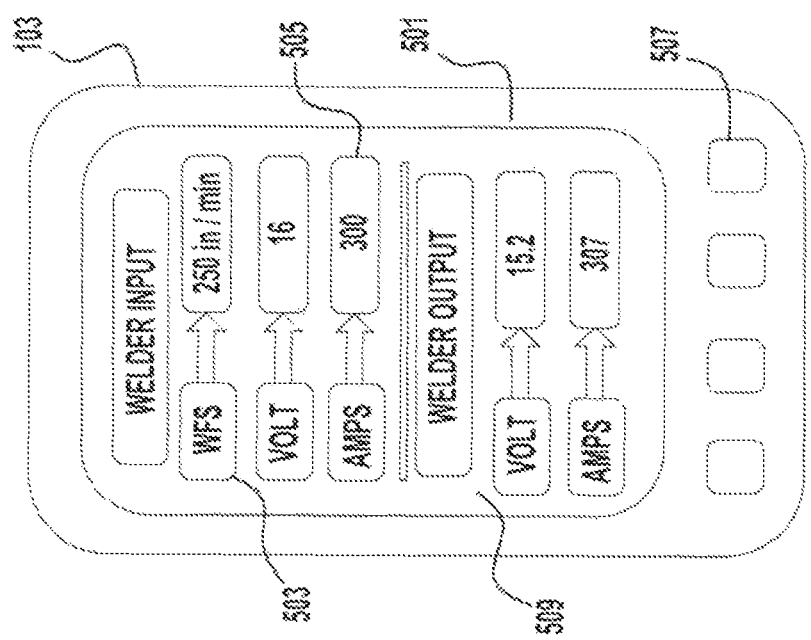
FIG. 5 is a diagrammatical representation of a communication device used in exemplary embodiments of the present invention.

FIG. 5 depicts a representative mobile communication device 103 capable of being used with embodiments of the present invention. The device 103 may contain some physical input controls 507—although this is not necessary for all embodiments—and contain a display screen 501. Because the construction and operation of such mobile communication devices are known, they need not and will not be discussed in detail herein. As stated above, the device 103 contains an application which allows a user to input operational data to the device 103 to be transmitted to a power supply 101. In FIG. 5, a user input screen is shown which allows a user to input variables such as: wire feed speed, voltage and current, each of which are shown with input data icons 503. Of course, embodiments of the present invention are not limited to these input variables as any variables can be used, for example travel speed, etc. Adjacent to each user input icon 503 is a user input data field 505 which displays the value input by the user. The data can be input by any known means of operating mobile devices, including but not limited to, touch screen, keypad, electronic pointer device, audio command, etc. Once the appropriate operation data is input into the device 103 it is sent to the power supply 101 which then uses the data to control a welding or cutting operation. No user input information is input via the power supply 101 itself.

FIG. 5 also shows that the device 103 can display output data 509, which is feedback from the power supply 101. For example, in a welding operation, it may be desirable for the user to monitor some of the output of the power supply 101, including current and voltage. This data can be displayed on the screen 501. Of course, the feedback data is not limited to current and voltage, but can include any feedback parameters which the user wishes to monitor.

Figure 6:
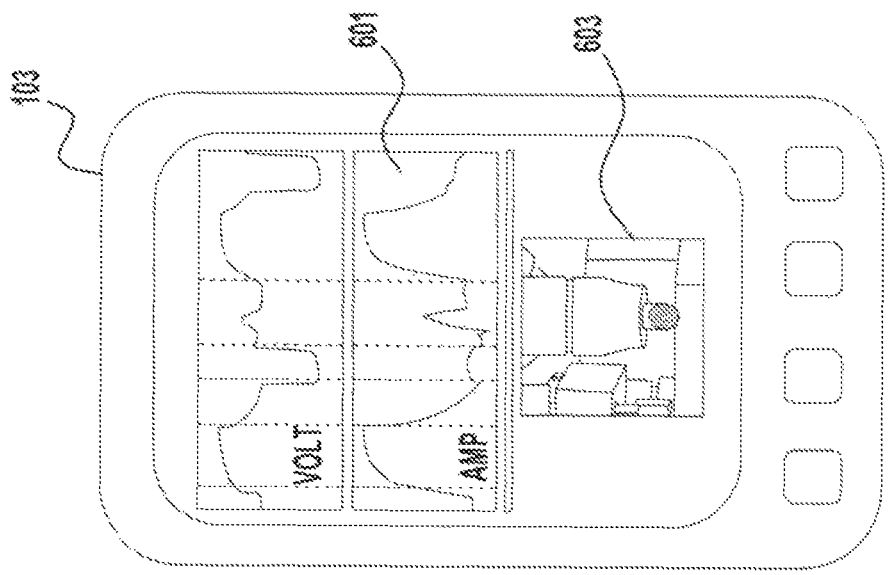
FIG. 6 is a diagrammatical representation of the communication device showing additional data.

FIG. 6 depicts the mobile device 103 showing additional information regarding the operation of the power supply, including output waveforms 601 and an image 603 from an imaging device 203. The depiction in FIGS. 5 and 6 are not intended to be limiting as the information can be displayed in many different ways. Embodiments of the present invention are not limited in this regard. In fact, the versatility in the capabilities and programming of mobile devices 103 greatly expands the manner in which welding or cutting operations can be controlled and monitored.

Of course, it is also contemplated that the mobile devices 103 have memory capacity which can store any relevant user input or feedback data regarding the operation of a power supply 101.

Figure 7:
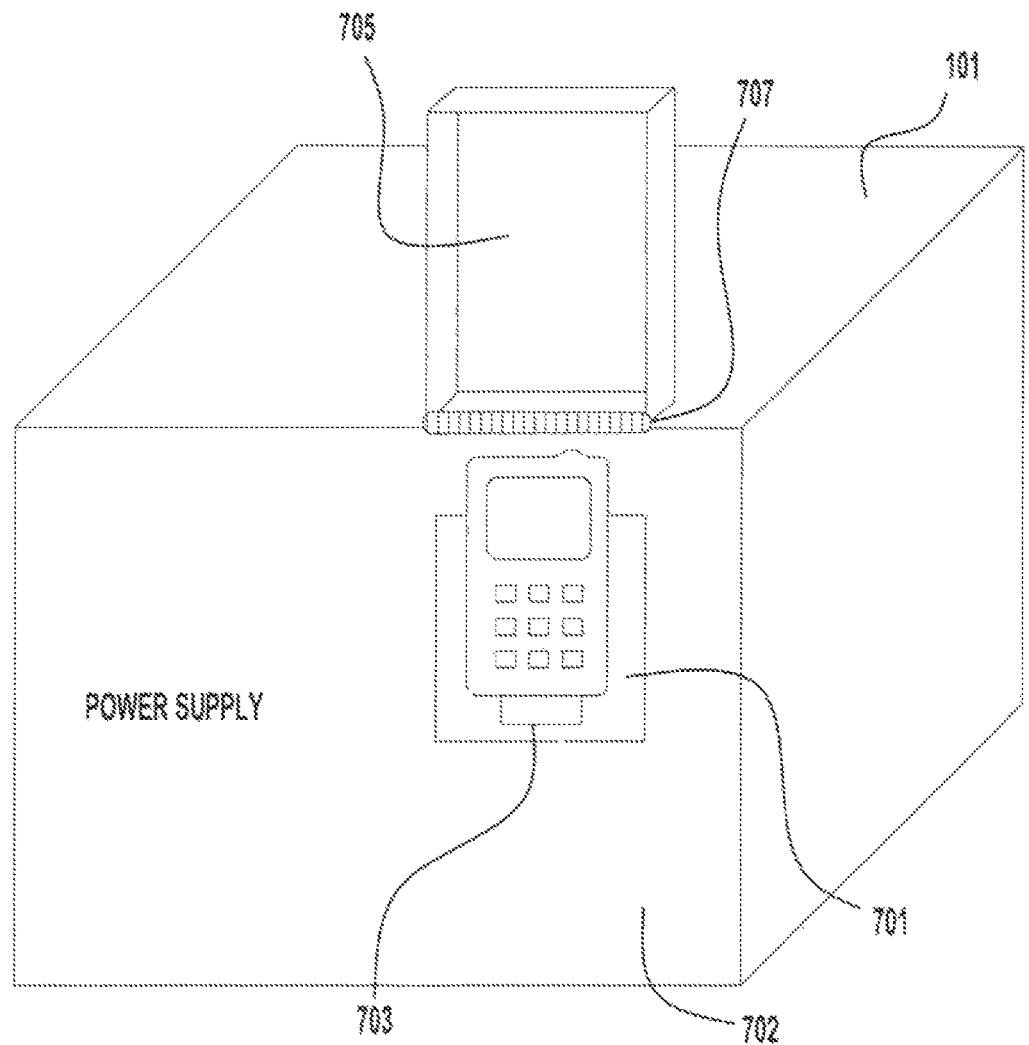
FIG. 7 is a diagrammatical representation of a welding/cutting power supply in accordance with an embodiment of the present invention.

FIG. 7 depicts another exemplary embodiment of the present invention. Specifically, the power supply 101 (whether welding or cutting) contains a mounting structure 701 which is capable of securing the mobile communication device 103 to the housing 702 of the power supply 101. In some situations or conditions it may not be necessary for the communication device to be positioned remotely from the power supply 101. Thus, the mounting structure 701 permits the communication device 103 to be removably secured to the housing 702 so that the device 103 can act as a user interface positioned physically on the power supply 101. The mounting structure 701 should be configured to sufficiently secure the device 103 to the housing 702 to prevent inadvertent disconnection of the device 103 from the housing 702, but should also permit the device 103 to be removable for remote operation. Also coupled to the housing 702, and perhaps made integral to the mounting structure 701 is a data connection device 703. The data connection device 703 is of a type that allows for the mobile communication device 103 to be docked with the power supply 101 such that data and communication between the mobile device 103 and the power 101 supply can be accomplished via a communication/data port on the mobile device 103. Such data connection devices include, but are not limited to, universal serial bus (USB), mini-USB, enhanced mini-USB, and other commercially available or proprietary data communication ports. Furthermore, the data communication port 703 can also allow for power transfer from the power supply 101 to the communication device 103 such that when docked a battery in the communication device 103 can be charged. Thus the port can allow for the transfer of data and power. During operation a user can "dock" the mobile communication device 103 in the mounting structure 701 to couple the device 103 to the port 703 and then use the mobile device 103 as a user input panel for the power supply 101. It should be noted that it is not necessary for the data communication port 703 to be located at or near the mounting structure 701. In fact, the port 703 can be located such that a cable or wired connection can be utilized between the mobile communication device 103 and the power supply 101.

In addition to the foregoing, embodiments of the present invention also provide operational security to the welding systems described herein. With a traditional power supply the user interface is on the power supply such that if the power supply is stolen it can be still be fully operated. Similarly, the power supply can be operated by unauthorized users or the power supply can have some of its operational settings changed without authorization. Embodiments of the present invention prevent this from occurring by employing security or identification keys which are stored in both the power supply and the mobile communication device such that only an authorized user can operate the power supply. For example, (referring to FIGS. 1, 4) each of the communication device 103 and the power supply 101 have a security key stored in their respective memories. When an authorized user of the system 100 wishes to operate the power supply 101 and transmits operational parameters from the mobile device 103 the mobile device can communicate its security key. The power supply 101 validates this security key (e.g., by comparing it to its stored security key) and if the comparison is favorable the operation can proceed. Similarly, the power supply 101 can query the mobile device 103 for the proper security key to determine whether or not to accept instructions from the device 103. For example, once a communication connection is made (for example using a Blue Tooth communication protocol) the device 103 and/or power supply 101 can query each other to validate the respective security keys and begin operation. However, if an unauthorized user—who in fact may have a mobile device 103 with an appropriate welding or cutting application installed—wishes to operate the power supply 101 they will be unable to do so because the unauthorized user's mobile device will not have the appropriate security key. Moreover, because the power supply 101 does not have a user interface, the unauthorized user will be unable to manually operate the power supply. In exemplary embodiments of the present invention the security key validation by the power supply 101 can be accomplished in the control electronics 407 which possesses a memory and validation protocol for storing the appropriate validation or security key and carrying out the process of validating the mobile communication device 103 prior to operation.

In other exemplary embodiments, the above described mounting structure can be located on a wire feeder 201 or other component of the welding system 100/200/300. It is not necessary that the mounting structure be on the power supply 101.

In either of the above described embodiments, the mobile communication device 103 is still capable of communicating with other components wirelessly during welding. For example, if the mounting structure 701 is on the power supply 101, the communication device 103 can still communicate directly with a wire feeder 201. Of course, in other exemplary embodiments the power supply 101 can communicate with the wire feeder 201 (or other components) via either a wired or wireless connection to provide the necessary operational data from the mobile communication device 103 to respective component.

In another exemplary embodiment of the present invention, an environmental protection housing 705 is secured to the housing 702 of the power supply 101 which can be positioned to cover the mobile communication device 103 from environmental conditions. For example, the protective housing 705 can be made of a transparent plastic material and secured to the housing 701 via a hinge structure 707. This allows the protective housing 705 to be positioned over the mobile device 103 to protect it from damage, but allow the information to be seen. The protective housing 705 can be made from any number of materials which can provide sufficient environmental and/or structure protection. Although not shown, a locking structure can also be placed on the housing 701 and/or protective housing 705 to lock the protective housing 705 in a closed position.

By eliminating all user input hardware and software in the power supplies, wire feeders, and other systems used in welding and cutting operations, embodiments of the present invention provide significant cost reductions in the power supplies, while simplifying the operability of the systems. This simplification comes in part, through the ease at which custom applications can be created for mobile communication devices, as opposed to customizing specific power supplies.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A welding or cutting system, comprising:
   a plurality of welding or cutting power supplies to respectively perform welding or cutting operations; and
   a mobile communication device comprising a mobile communication programming application and a welding or cutting programming application installed thereon, said welding or cutting programming application allowing a user to respectively input all operational parameters needed to control each of said operations into said mobile communication device and real-time communication with said plurality of welding or cutting power supplies;
   wherein said plurality of power supplies do not have a user input interface other than said mobile communication device such that said mobile communication device is used exclusively to input said all operational parameters of each of said plurality of power supplies, and
   wherein said mobile communication device is a smartphone that distinguishes between said plurality of power supplies to transmit said all operational parameters of each of said plurality of power supplies.

2. The welding or cutting system of claim 1, wherein said mobile communication device is a third party communication device.

3. The welding or cutting system of claim 1, wherein each of said welding or cutting power supplies comprises a switch to turn said power supply on and off.

4. The welding or cutting system of claim 1, further comprising a wire feeder device for each of said plurality of power supplies, each wire feeder device requiring input of a second operational parameter to perform a second operation, wherein said mobile communication device communicates said respective second operational parameter to each of said wire feeder device, and wherein each of said wire feeder devices does not have a user input interface such that said second operational parameter cannot be input into said wire feeder device without said mobile communication device.

5. The welding or cutting system of claim 1, wherein said mobile communication device comprises a display screen which displays at least one of said operational parameters and feedback data from said welding or cutting power supply.

6. The welding or cutting system of claim 1, wherein said welding or cutting power supply comprises a housing having a mounting structure and a data connection device such that said mounting structure secures said mobile communication device to said housing and said data connection device couples to said mobile communication device to allow for exchange of data between said welding or cutting power supply and said mobile communication device.

7. The welding or cutting system of claim 1, wherein said mobile communication device has a security key which is transmitted to said welding or cutting power supply prior to operation of said welding or cutting power supply, and wherein said welding or cutting power supply will not operate unless said security key is determined to be an authorized security key.

8. The welding or cutting system of claim 1, wherein said mobile communication device operates said welding or cutting power supply from a remote location via a wireless connection.

9. The welding or cutting system of claim 1, wherein said mobile communication device stores identification information of each of said plurality of power supplies and uses said identification information to control said operation of each of said power supplies.

\* \* \* \* \*